O. MacLANGLOIS.
TIRE VULCANIZING MOLD.
APPLICATION FILED APR. 18, 1919.
1,358,381.
Patented Nov. 9, 1920.
2 SHEETS—SHEET 1.
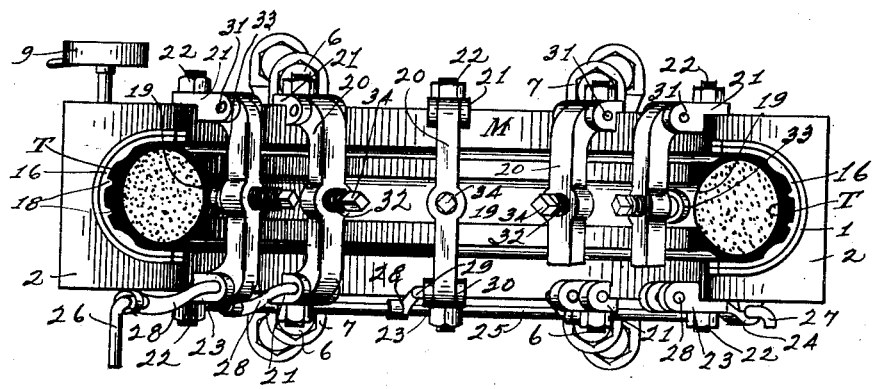
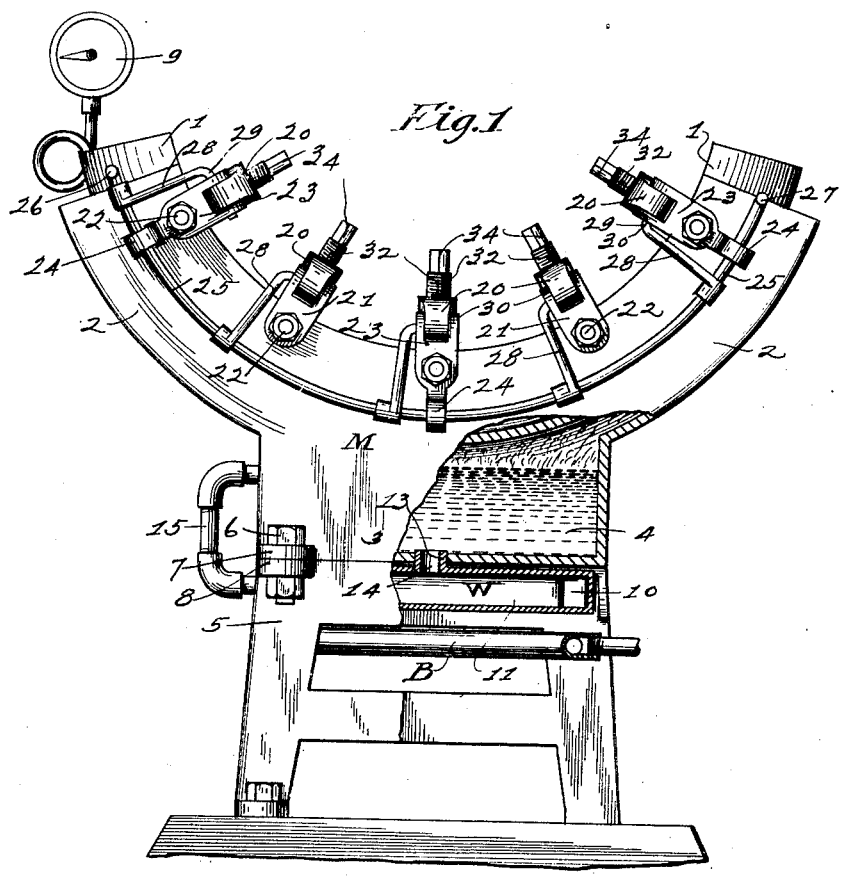
INVENTOR:
Obart M. Langlois, O. MacLANGLOIS.
TIRE VULCANIZING MOLD.
APPLICATION FILED APR. 18, 1919.
1,358,381.
Patented Nov. 9, 1920.
2 SHEETS—SHEET 2.
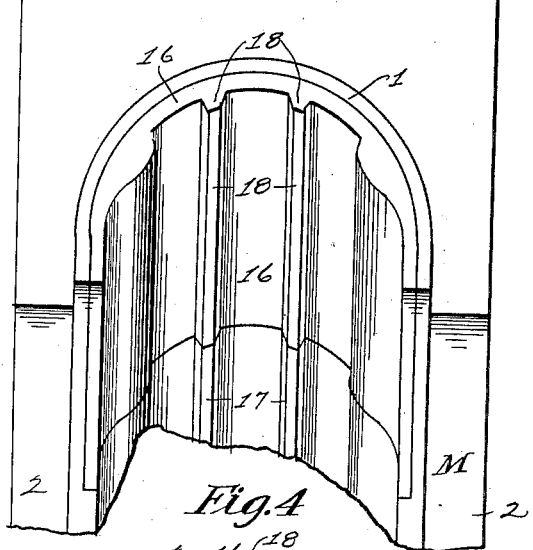
Fig. 4
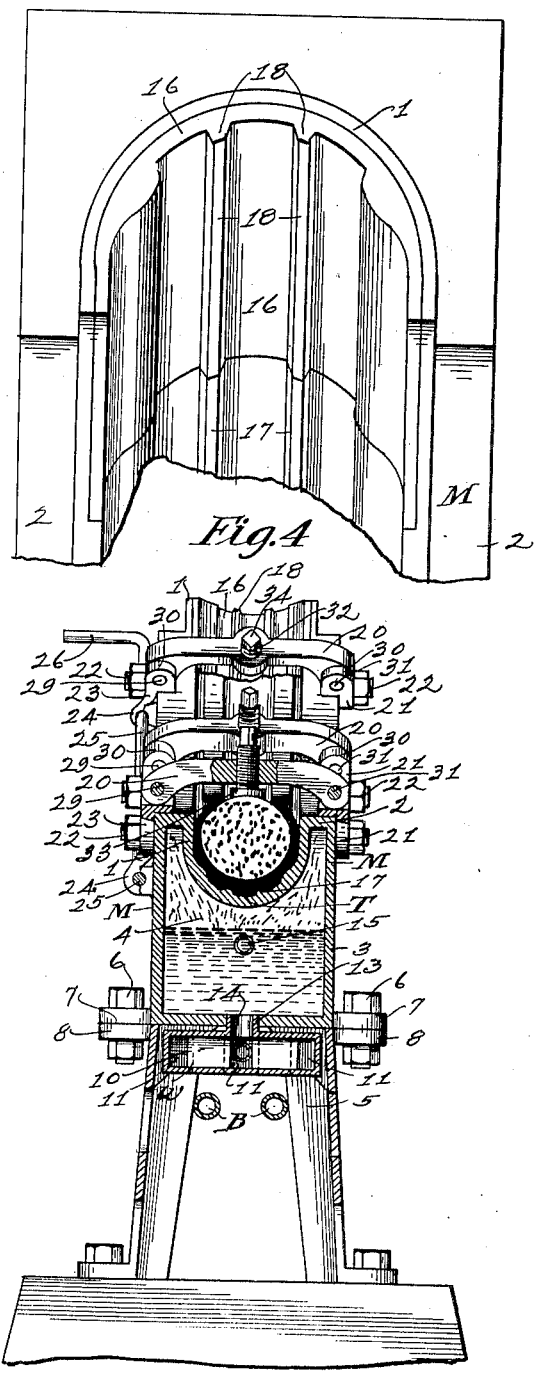
Fig. 3
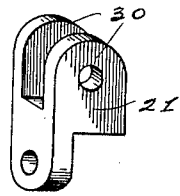
Fig. 8
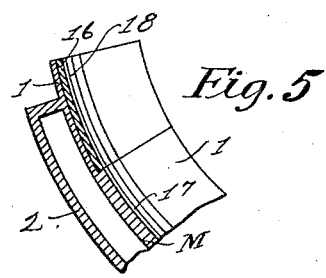
Fig. 5
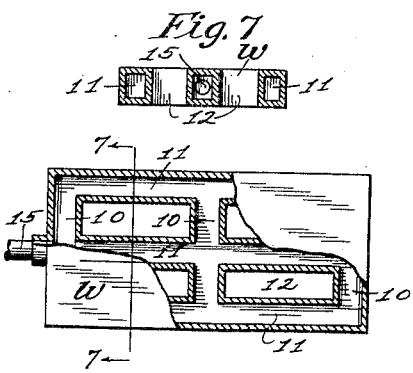
Fig. 7
Fig. 6
INVENTOR:
Obarl M. Langlois

UNITED STATES PATENT OFFICE.

OBART MacLANGLOIS, OF LOS ANGELES, CALIFORNIA, ASSIGNOR OF ONE-HALF TO JAMES W. OAKES, OF LOS ANGELES, CALIFORNIA.

TIRE-VULCANIZING MOLD.

1,358,381.　　　　　Specification of Letters Patent.　　Patented Nov. 9, 1920.

Application filed April 18, 1919. Serial No. 292,488.

*To all whom it may concern:*

Be it known that I, OBART MacLANGLOIS, a citizen of the United States, and a resident of Los Angeles, in the county of Los Angeles and State of California, have invented certain new and useful Improvements in Tire-Vulcanizing Molds, of which the following is a specification.

This invention relates to molds for retreading pneumatic tires, such as are used on automobiles and the like, and the primary objects are to provide in a mold of this character, improved means for holding the tire in position in the mold for the vulcanizing operation, together with improved means for heating the mold.

Another object of my invention is to provide a circulating water system for a mold of the character referred to and means for distributing the water over a burner, whereby the water may be more readily heated and the steam pressure more quickly obtained than in molds heretofore used.

A further object is to provide manually operable means for simultaneously locking and unlocking the multiple clamping devices usually employed in molds of this character, and to provide a massive structure of substantial strength and size so as to withstand great pressure and strains, and at the same time to provide a mold which will be relatively economical in initial and maintenance costs and thoroughly effective for vulcanizing purposes.

A still further object is to provide in a mold of the character referred to and adapted to be inserted in the ends of the mold, short molding sections, preferably of wood, or of other material which is non-heat conducting, in order that the ends of the mold during the operation thereof may have substantially less temperature than the body of the mold.

I am aware that it is old in the art to employ broadly, surfaces at the ends of the mold which are non-heat conducting for the purposes stated, but in my mold, I have provided an improved means and a novel method of attachment of said means which renders the mold effective and practical.

I am also aware that other molds having the same general form of my mold have been heretofore used in the vulcanizing art, but I am not aware that the several improvements mentioned above and to be hereinafter fully described have ever been known or used. Other objects may appear as the description progresses.

With the above objects in view, I have shown in the accompanying drawings, forming a part of this specification, one practical embodiment of my invention, in which certain novel features and arrangement of parts are clearly shown, and which will be described in detail in the specification following.

With particular reference to the drawings:

Figure 1 is a side elevation of my mold, partly in section;

Fig. 2 is a plan of the same with a tire shown in the mold;

Fig. 3 is a transverse section of the same;

Fig. 4 is an enlarged view of one end of the mold showing my wooden inserts in operating position in the tread forming portion of the mold;

Fig. 5 is a fragmentary longitudinal section of one end of the mold showing the wooden inserts also in section;

Fig. 6 is a plan view, partly in section, of my improved water circulating element and distributing means;

Fig. 7 is a transverse section of the same on line 7—7; and

Fig. 8 is a perspective view of one of the tire clamping brackets.

Similar characters of reference are employed throughout the specification and in the several views of the drawings for indicating the same or like parts.

In a mold of the character referred to, the tread forming portion, which may be of any design, is in the form of a sector and has a range of approximately one-third of the circumference of the tire, or about 120 degrees, and it will be obvious that when treads are vulcanized on tires, that at least three successive operations are required for making a complete tread. Usually the mold is slightly longer than the length of tread to be formed at a single operation, so that there is a little overlapping in the mold during the formation of the tread of a tire, the ends of the mold being heated to the same temperature as the body when the mold is formed completely of metal from end to end, are apt to damage or mar a new tread or a portion of a new tread which has been previously completed when the tire is turned in the mold preparatory to a succeeding operation, and heat portions of a tire longer than other portions, and my mold is designed to obviate this difficulty, and to maintain a relatively low temperature at the ends of the mold in such cases and uniformity in the curing of the rubber.

Also, a mold of this character has a plurality of clamping devices, which are independently operated for holding the tire in the mold, and it will be apparent that quite a lot of time is consumed in locking and unlocking all of these clamping devices independently. In my device as shown in the drawings, I have provided means for simultaneously locking and unlocking these clamping devices, by which a great amount of time will be saved in vulcanizing operations.

My improvements are mounted on the usual form of mold M, having an arcuate tread forming portion 1, a hollow upper body portion 2, of rectangular cross section, and a lower rectangular portion, or base 3, in which is a water reservoir 4, in communication with the steam chamber within the body portion 2. The mold M, is adapted to be mounted upon a skeleton base 5, and is attached thereto by means of bolts 6, extending through lugs 7 formed on the mold and feet 8 on the top of said base. A suitable steam gage 9 may be attached at a convenient point to the body 2 for communication with the steam chamber therein, as shown, and also a safety valve, not shown, may be attached to said body, as in other types of molds.

A water receptacle and distributer W, as shown in detail in Figs. 6 and 7, is provided for attachment to the bottom of the mold base 3 and has a plurality of transverse channels, or ducts, 10, and longitudinal channels 11 formed therein which communicate with each other, air spaces 12 being formed between said channels, so as to permit the upward flow of air and heat from a burner B, to pass between the water channels in the receptacle W for quickly heating the water therein. The receptacle W, is attached to the base 3 by means of a nipple 13, which is screwed into the bottom of the base and the passage 14 therein is in communication with the central channels 10 and 11, and one end of said receptacle is also connected with the water chamber of said base by means of a pipe 15, the upper end of which connects with the water chamber of the base at a point just below the normal water level, so that water may freely circulate through the receptacle W and the base chamber 4.

A burner B, of suitable character may be supported on the base of the mold in any suitable manner, a U-shaped burner being shown in the drawings and said burner being arranged, preferably, so that the flames will be directed upwardly between the channels 10 and 11 of receptacle W and through the air spaces 12. Thus the water which circulates through the receptacle W may be quickly and effectively heated by means of the arrangement and connections shown and described, and steam will be generated in the water chamber 4 more quickly than if the heat were applied directly to the bottom of the base of the mold, as in other types of mold. This is true because the water is thoroughly distributed in small volumes over the burner, and is, therefore, more quickly heated than otherwise.

At the ends of the tread forming portion 1 of the mold, I provide inserts of wood or other suitable non-heat conducting material, as at 16, which are arcuate in cross section and extend downwardly from the extended ends of portion 1 for a convenient distance and may be attached to the portions 1 in any suitable manner. The tread forming mold portion 1, may have any desirable design of tread mold thereon and the inserts 16 are made to correspond to selected designs. Ribs are shown in the drawings which extend circumferentially around the mold and the ribs 17, on the portion 1, are in register with similar ribs 18 on the inserts, as shown, the portion 1, being recessed, as shown to receive the inserts and so that the exposed surfaces thereof will be flush with and register properly for making tire treads.

A tire T is placed in the mold in the manner shown and usually a fabric bag 19 is employed for filling the interior of the tire during the tread forming operation, so as to hold the tire fully expanded and in normal shape. The bag is usually filled with sand or like material. A plurality of transverse members 20, 20, etc., of sufficient size and strength to withstand great strain are provided for attachment to the mold body 2 and are adapted to span the distance between the opposite sides of the mold, as shown. These members 20, are pivotally held on one side of the mold in brackets 21, 21, etc., which are attached at their lower ends to the side of the body 2 by means of bolts 22, 22, etc. Five of such transverse members are shown in the drawings and are attached at one side as stated, the opposite ends of two of said members being removably attachable to similar brackets, while the ends of the remaining members are attached to brackets 23 of slightly modified form, as shown in Fig. 1. The brackets 23 have lugs 24 formed on the lower ends thereof, which are adapted to slidably receive a rod 25 which is curved concentrically with the portion 1 of the mold and has a handle extension 26 at one end and a stop extension 27 at the other end. The brackets 21 and 23 project inwardly over the inner face of the mold body so that they will be prevented from turning on the bolts 22.

Locking members 28 are suitably attached to the rod 25 opposite each of the brackets 21 and 23 on one side of the mold, and said members have horizontal extensions 29 thereon which are adapted to be inserted in the upwardly extended furcations 30 of the brackets and in the ends of the transverse members 20 for holding the members 20 locked in said brackets during the tread forming operation. The opposite ends of members 20 are permanently held in the other brackets 21 by means of pins or bolts 31.

Each of the members 20 has a clamping screw 32 mounted centrally thereon and carrying on the bottom thereof a suitable flange 33 and having on their outer ends a squared portion 34 by means of which the screws may be tightened for holding the flanges 33 in firm contact with the bag 19, these screws being turned independently for positioning the tire in the mold.

It will be obvious that when the handle 26 on locking rod 25 is pulled or pushed in a given direction, the ends 29 of the locking members 28 will be likewise moved either out of or into the furcations of the brackets 21 and 23 for either locking or unlocking the transverse members 20, as the case may be, all of said locking members being moved simultaneously. The movement of the rod 25 will be limited in opposite directions by means of the extensions 26 and 27 on the opposite ends thereof.

The brackets 21 and 23 and the members 20 are easily and quickly removable from the mold when the locking members are released therefrom and the retaining pins on the opposite side of the mold are removed, and when a tire is to be changed in the mold, it is necessary only for the locking members to be released by the movement of the rod 25, the clamping screws having been first loosened, whereupon the members 20 may be turned backwardly about the pins or bolts 31.

It will be understood that the wooden inserts 16 will ordinarily be relatively cool when the mold is hot enough for effective vulcanizing purposes, and the tread of the tire will not be overheated or junction lines formed thereon by the use of said inserts. As in a retreading operation, there is a substantial overlapping of the tread portions of a tire when a change is made for extending the tread thereon, by the use of my device it will be impossible with sufficient care being exercised to cure one portion of a tire for a greater length of time than another and uniformity of such work will thus be accomplished.

What I claim is:

1. In a tire mold, a tread forming mold having recesses formed in the ends thereof, and wooden inserts supported in said recesses and having exposed surfaces for registration with the surface of the mold.

2. In a tire mold, a tread forming member of semi-circular cross section and provided with tread forming means thereon, and non-heat conducting means also of semi-circular cross section supported in the end of said tread forming means.

3. In a tire mold having a tread forming member of substantially semicircular section, a semi-circular non-heat conducting element mounted wholly within the end of said tread forming member and having the exposed surfaces thereof in register with said forming member.

4. A semi-annular tire mold having a tread forming member and a body integral therewith, a plurality of clamping devices adjustably supported on opposite sides of said body, for clamping a tire in position in the mold, and means engaging and for simultaneously locking and unlocking all of said clamping devices.

5. A tire mold of the character described including a semi-annular molding member, a plurality of clamping devices spanning the inner side of said member for holding a tire in position therein, and common means adapted to engage and simultaneously lock and unlock all of said clamping devices.

6. A tire mold including a semi-annular molding member, a plurality of clamping devices attached to the opposite sides of and spanning the inner side of said molding member for holding a tire, locking members for each of said devices, and common means adapted to engage and simultaneously lock all of said devices.

7. A tire mold comprising a semi-annular molding member, a plurality of clamping members pivoted on one side thereof, brackets on said molding member, locking members for connection with said brackets for holding said clamping members in operative position, and a common member for simultaneously operating all of said locking members.

8. A tire mold having a semi-annular body provided with a tire holding recess of semi-circular cross section, the ends of said tire holding recess being enlarged substantially and inserts of non-heat conducting quantity being carried therein so that the tire engaging portions thereof will register with the tire engaging portions of the mold.

9. A tire mold comprising a semi-annular body having a mold therein of semi-circular cross section, brackets mounted in pairs on the opposite sides of the body, and having portions engaging the inner periphery of said body for preventing the turning thereof, clamping bars extended transversely across the inner side of the body and attached at the ends to said brackets, and means carried on said bars for clamping the tire in position in the mold.

10. A tire mold including a body having a semi-circular mold therein, a series of brackets attached to the opposite sides of said body, clamping bars transversely disposed across said body and adapted to be permanently held on the brackets at one side of said body and to be removably held on the other side of said body, and a common locking member adapted to engage and lock all of said bars to said brackets, as set forth.

11. A tire mold having a semi-annular body provided with a tread forming mold portion of semi-circular cross section, a water chamber centrally positioned below said mold portion and a steam chamber communicating with said water chamber extending throughout the length of said mold portion, a pan-like receptacle having a plurality of longitudinal and transverse water passageways arranged at intervals therein and alternating their spaces between said passages, a pipe connecting one end of said receptacle with said water chamber and a central connection between said receptacle and said water chamber, whereby circulation may be afforded therebetween.

12. A tire mold having a semi-annular body provided with a tread forming mold portion of semi-circular cross section, a water chamber centrally positioned below said mold portion and a steam chamber communicating with said water chamber and extending throughout the length of said mold portion, a pan-like receptacle having a plurality of longitudinal and transverse water passageways arranged at intervals therein and alternating their spaces between said passages, a pipe connecting one end of said receptacle with said water chamber and a central connection between said receptacle and said water chamber, whereby circulation may be afforded therebetween, and means disposed below said receptacle for heating the water therein.

13. A tire mold comprising a semi-circular body having a tire receiving mold of semi-circular cross section, a series of brackets mounted on each of the sides of said body in opposed relation, transverse members pivotally connected at their opposite ends to the opposite brackets of said series, and means carried in said transverse members for adjusting and confining a tire in said mold.

14. A tire mold having a central molding portion, a plurality of bifurcated brackets supported in pairs on the opposite sides of said mold, and transverse clamping members pivotally held between the furcations of the brackets on one side of said mold and adjustably connected between the furcations of the brackets on the other side of said mold for confining a tire in the mold.

Signed at Los Angeles, Los Angeles county, California, this 11th day of March, 1919.

OBART MacLANGLOIS.

In presence of—
J. W. OAKES,
H. M. BRUNDAGE.